(12) United States Patent
Zheng

(10) Patent No.: US 6,895,127 B1
(45) Date of Patent: May 17, 2005

(54) PHOTOMONTAGE USING MULTIPLE LAYER PLACEMENT AND COLOR VARIATION

(75) Inventor: Juneng Zheng, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 572 days.

(21) Appl. No.: 09/657,070

(22) Filed: Sep. 7, 2000

Related U.S. Application Data

(63) Continuation-in-part of application No. 09/394,115, filed on Sep. 10, 1999, now Pat. No. 6,549,679.

(51) Int. Cl.[7] .............................. G06K 9/32; G06K 9/36
(52) U.S. Cl. ....................................... 382/294; 382/284
(58) Field of Search ................................ 382/162, 164, 382/165, 284, 294; 345/589, 592, 593, 622, 629, 630

(56) References Cited

U.S. PATENT DOCUMENTS

| | | | | |
|---|---|---|---|---|
| 5,724,494 A | * | 3/1998 | Politis | 345/592 |
| 5,841,898 A | * | 11/1998 | Liguori | 382/164 |
| 5,867,166 A | * | 2/1999 | Myhrvold et al. | 345/419 |
| 6,014,464 A | * | 1/2000 | Kurzweil et al. | 382/233 |
| 6,016,150 A | * | 1/2000 | Lengyel et al. | 345/426 |
| 6,026,215 A | * | 2/2000 | Fantone et al. | 358/1.2 |
| 6,137,498 A | | 10/2000 | Silvers | 345/435 |
| 6,204,859 B1 | * | 3/2001 | Jouppi et al. | 345/592 |
| 6,215,503 B1 | * | 4/2001 | Snyder et al. | 345/629 |
| 6,281,904 B1 | * | 8/2001 | Reinhardt et al. | 345/582 |

FOREIGN PATENT DOCUMENTS

| | | |
|---|---|---|
| EP | 0 852 363 A2 | 7/1998 |
| EP | 0 935 217 A2 | 8/1999 |

OTHER PUBLICATIONS

"Photomosaics a new chapter in the history of mosaics", downloaded May 12, 2000 from <http://www.photomosaic-.com/home.htm>, Runaway Technology, Inc.

"Photo Tiled Mosaics", downloaded May 12, 2000 from <http://www.infinite-image.net/>, Infinite Image (1999).

"Photo Montage", downloaded May 12, 2000 from <http://members.bellatlantic.net/~ebracrl/mont.html>, Photo Creations.

* cited by examiner

*Primary Examiner*—Samir Ahmed
*Assistant Examiner*—Brian Le
(74) *Attorney, Agent, or Firm*—Patent Law Group LLP; David C. Hsia

(57) ABSTRACT

A method generates a composite image by painting unfilled regions between micro-objects with other micro-objects to create a multiple layer effect. Another method generates a composite image from as few as one micro-object by changing the average color and/or intensity of the micro-object to match that of an area on the source image. Yet another method quickly generates a preview image of a composite image by saving the micro-objects in multiple resolutions so that the micro-objects at the small resolution can be quickly scaled to build a preview image of the composite image.

53 Claims, 8 Drawing Sheets

PHOTOMONTAGE USING MULTIPLE LAYER PLACEMENT AND COLOR VARIATION

CROSS-REFERENCE TO RELATED APPLICATIONS

This application is a Continuation in Part of application Ser. No. 09/394,115, filed Sep. 10, 1999, entitled "AUTOMATED PICTURE MONTAGE METHOD AND APPARATUS," now U.S. Pat. No. 6,549,679, which is incorporated by reference herein in its entirety.

BACKGROUND

1. Field of the Invention

This invention relates to digital image processing and more particularly to a method that generates a composite image from the placement of small individual images.

2. Description of Related Art

Montage refers to the art, style, or process of making a pictorial composition by closely arranging or superimposing many pictures or designs. Similarly, a mosaic is a composite picture assembled from overlapping photographs. Runaway Technology, Inc. of Cambridge, Mass., sells composite pictures assembled from thousands of images by a computer software called Photomosaicsam™. Other companies, including Infinite Image of Tarzana, Calif., and Photo Creations of Willianstown, N.J., also offer similar products, services, and computer software. In general, the conventional computer software divides a source image using an orthogonal grid. The conventional computer software then creates a composite image by placing small individual images ("micro-images" or "micro-objects") into a grid. Each small image has color and brightness that are the same or similar to an associated area in the source image.

One deficiency of the conventional computer software is the requirement of a large database of micro-images (e.g., 5,000 or more) to build a high quality composite image. A large database of micro-images allows the conventional computer software to select micro-images that closely resemble the color and brightness of each grid location in the source image. Many consumers would like to create a montage but do not have a large database of micro-images. These consumers may not wish to pay the additional cost for inclusion of a large database of micro-images with conventional computer software for creating composite images. Furthermore, consumers may wish to use a small database of their own micro-images (e.g., their own photos and images) to build a composite image. Thus, a need exists for a method that reduces the number of micro-images required to create a high quality composite image.

A goal of photo-montage software is to create an interesting and attractive image. However, current photo-montage software has limited capability in the arrangement of the micro-images, and a system that permits a more complex placement or arrangement of micro-images is desired.

Another deficiency of the conventional computer software is that it takes a long time to compose and display (or print) the composite image because the composite image is generally large (e.g., a poster). The time required for the conventional computer software to compose and display (or print) the composite image is wasted if the user does not like the composite image after it is displayed (or printed). Thus, another need exists for a method that quickly generates a preview of the composite image before the user decides whether or not to compose and display (or print) the composite image.

SUMMARY

In one aspect of the invention, a method generates a composite image using multiple layers of small individual images (micro-images or micro-objects). One embodiment of the method uses a plurality of micro-objects with transparent and non-transparent regions. The method includes selecting a first area on a source image, selecting a first micro-object that resembles the first area on the source image, and generating the composite image by at least partially filling a first area of the composite image that corresponds to the first area on the source image with a non-transparent region of the first micro-object so that the first area on the composite image has at least one filled region and one unfilled region.

In one implementation, the method further includes the acts of selecting a second area on the source image that at least partially overlaps an unfilled region of the first area on the source image, selecting a second micro-object that resembles the second area on the source image, and generating the composite image by at least partially filling a second area on the composite image that corresponds to the second area on the source image with a non-transparent region of the second image. In so doing, the unfilled region of the first area on the composite image becomes at least partially filled with the non-transparent region of the second image.

In one variation, the filling of the second area on the composite image includes painting at least a portion of the non-transparent region of the second micro-object over at least a portion of the first micro-object in the second area on the composite image. This creates the visual effect that the second micro-object is laying on top of the first micro-object. In another variation, the filling of the second area on the composite image includes painting the non-transparent region of the second micro-object over only the unfilled regions within the second area on the composite image. This creates the visual effect that the second micro-object is laying below the first micro-object.

Thus, one advantage of the invention is the use of transparent regions of the micro-objects to create unfilled regions in the composite image that are filled with other micro-objects to create a multiple layer effect that simulates the feel of a traditional montage or mosaic.

In another aspect of the invention, a method is provided to generate a composite image from as few as one micro-object. The method includes selecting an area on a source image, selecting a micro-object, adjusting the color of the micro-object to resemble the color of the area on the source image, and generating the composite image by filling an area on the composite image that corresponds to the area on the source image with the micro-object. In one embodiment of the invention, selecting the first image includes the act of finding a micro-object with the smallest total adjusted color difference. The total adjusted color takes into consideration (1) the color difference between corresponding parts of the area on the source image and the micro-object and (2) the color difference between the average color values of the area on the source image and the micro-object. In one implementation of the invention, adjusting the color of the first micro-object includes adding (1) the color difference between the average color value of the first area on the source image and the first image to (2) the color values of each part of the micro-object to be displayed.

Thus, an advantage of the invention is the ability to build a high quality composite image with as few as a single micro-object by changing the average color intensity of the micro-object to match that of an area on the source image (a technique hereafter called "color variation"). Using color variation with only one or a few interesting micro-objects (e.g., one or more logos) creates an eye-catching visual effect.

In yet another aspect of the invention, a method quickly generates a preview image of a composite image. The method includes providing a plurality of micro-objects in at least a display resolution and a preview resolution, selecting an area on the source image having the preview resolution, selecting a micro-object that resembles the selected area, generating a preview image by filling the area on the source image with the micro-object at the preview resolution, and recording the identity of the micro-object and the location of the area on the source image on a list. In one embodiment, the method also includes scaling the selected micro-image from the display resolution to the preview resolution. In one implementation, the method further includes generating the composite image from the list by locating an area on the composite image that corresponds to the area on the source image and filling the area on the composite image with the micro-object at the display resolution.

Thus, an advantage of the invention is the quick composition of a preview image using micro-objects saved at a preview resolution that can be quickly manipulated.

Other aspects and advantages of the present invention will become apparent from the following detailed description and accompanying drawings.

DETAILED DESCRIPTION

Figure 1:
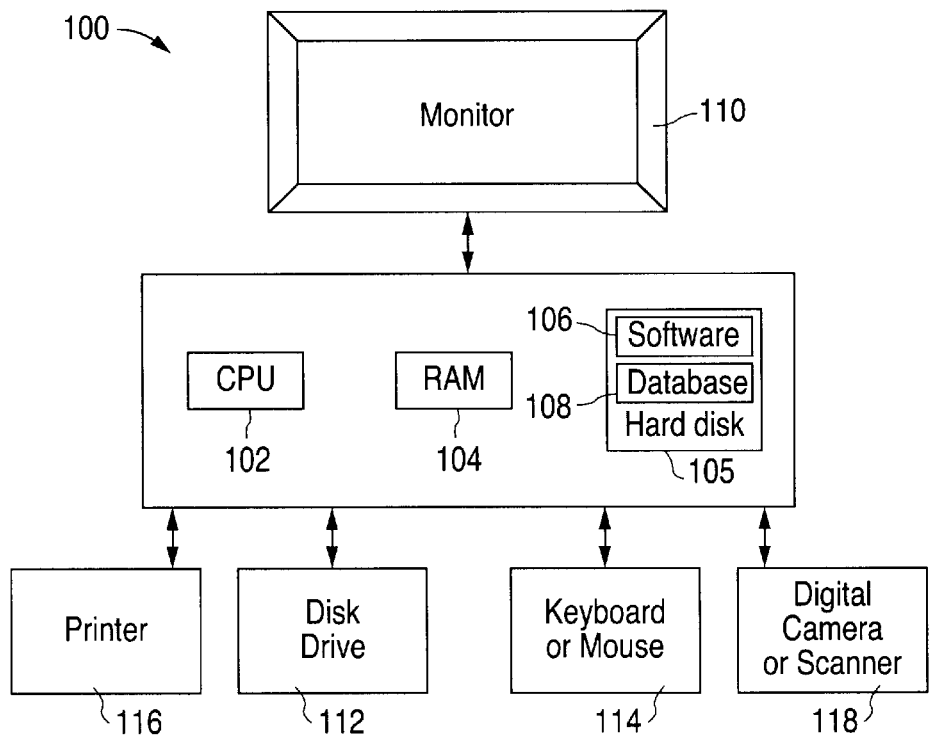
FIG. 1 is a block diagram illustrating a conventional computer used in one aspect of the invention.

FIG. 1 illustrates a conventional computer 100 used in one aspect of the invention. Conventional computer 100 includes a CPU 102, a random access memory (RAM) 104, and a hard disk 105 that stores a software 106 and a database 108. Database 108 contains one or more micro-objects. CPU 102 executes software 106 to create a composite image from micro-objects stored in database 108. Computer 100 is also coupled to a monitor 110, a disk drive 112, an input device 114 (e.g., keyboard or mouse), a printer 116, and a peripheral device 118 (e.g., digital camera or scanner).

Figure 2:
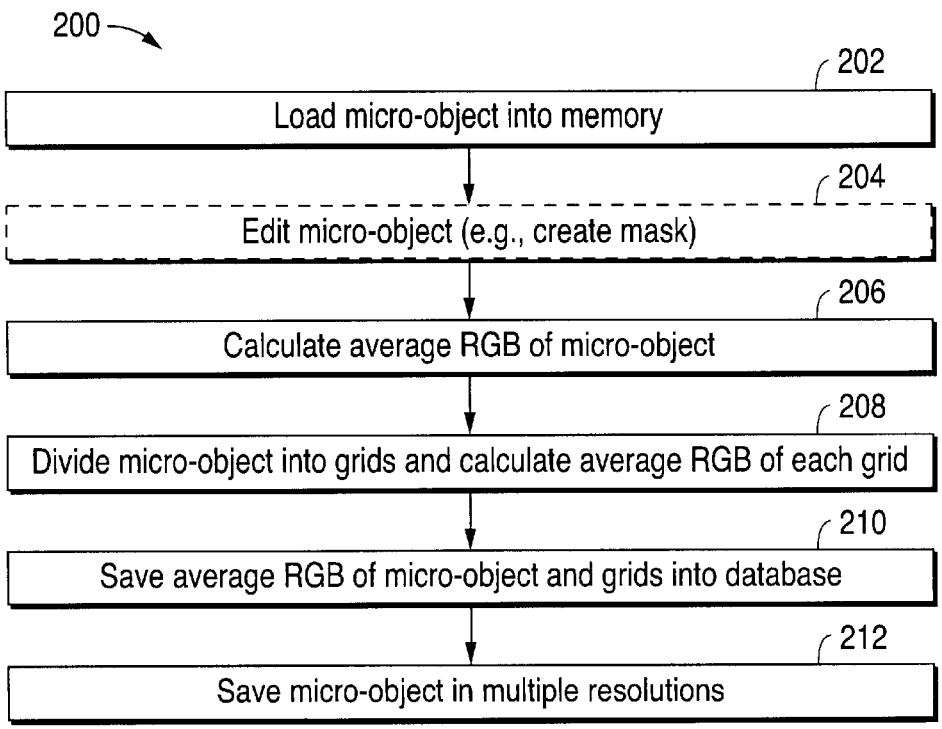
FIG. 2 is a flow chart illustrating a method for indexing a micro-object and adding the micro-object to a database used to generate a composite image.

FIG. 2 illustrates a method 200 for adding and indexing a micro-object to database 108 in accordance with one aspect of the invention. In action 202, CPU 102 loads to memory 104 a user-selected micro-image. In one embodiment, the micro-image is an existing file in hard drive 105 of computer 100. In another embodiment, the micro-image is a file that the user provides via disk drive 112 or downloads from the Internet.

Figure 5A:
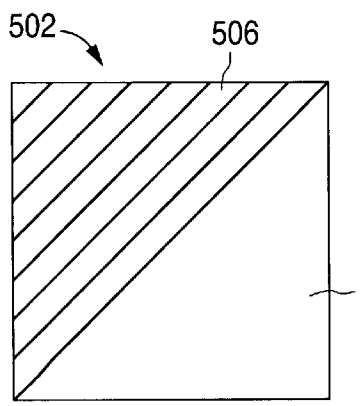
FIGS. 5A, 5B, and 5C are block diagrams illustrating micro-objects used in the methods of FIGS. 2, 3, and 4.
Figure 5B:
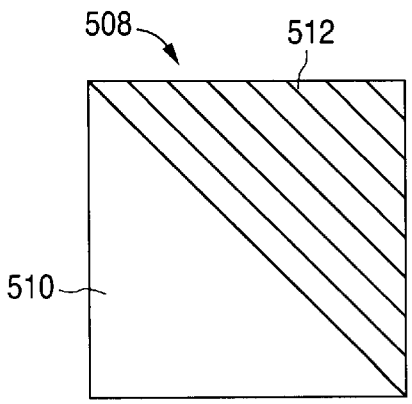

In action 204, CPU 102 optionally edits the micro-object under the commands of the user using a conventional imaging software on computer 100. In one embodiment, the conventional imaging software is part of software 106. The user can mask one or more regions in the micro-object, making the regions completely transparent (i.e., not displayed). The transparent region can be used to give the micro-images particular boundaries or shape. For example, the user can mask around an object so that the background is transparent. FIG. 5A illustrates a micro-object 502 in which the user has created a transparent region 504 and a non-transparent region 506, and FIG. 5B illustrates a micro-object 508 in which the user has created a transparent region 510 and a non-transparent region 512. Of course, the micro-object can have existing transparent and a non-transparent regions. Furthermore, the user can edit the micro-object to add conventional visual effects including mirror, rotate, distort, frame, and morph.

In action 206, CPU 102 calculates the average red, average green, and average blue (e.g., avgR, avgG, avgB) of the micro-object. The average RGB values of the micro-object are later used to select the micro-object that will form part of a composite image.

In action 208, CPU 102 divides the micro-object into grids and calculates the average red, average green, average blue, and average alpha (e.g., R, G, B, and A) of each grid from its pixels. The average RGB values of each grid of the micro-object are later used to select the micro-object that will form part of a composite image. In one embodiment, CPU 102 divides each micro-object that comprises w1×h1 pixels into w2×h2 grids, where w1 and h1 are the respective width and height of the micro-object in pixels, and w2 and h2 are the respective width and height of the divided micro-object in grids. In this embodiment, each grid is made up of w3×h3 pixels, where $$w3 = \frac{w1}{w2} \text{ and } h3 = \frac{h1}{h2}.$$

Figure 5C:
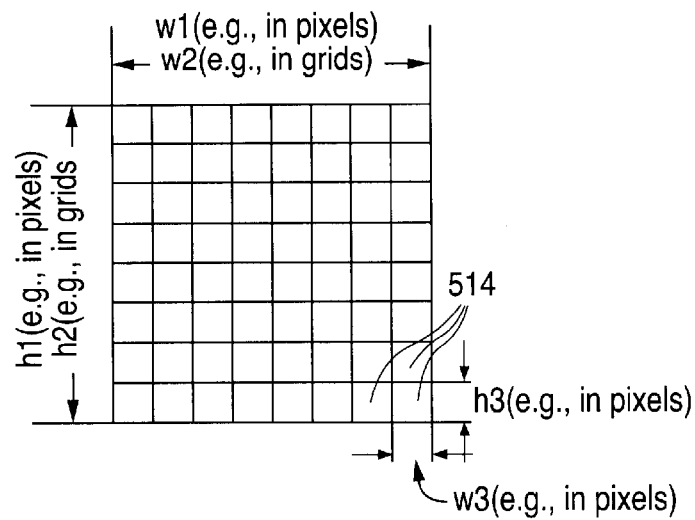

FIG. 5C illustrates how a micro-object 502 is divided into grids 514. The following table lists examples of the micro-object sizes, grid numbers, and the grid sizes.

TABLE 1

| Micro-object size (w1 × h1 pixels) | Number of Grids (w2 × h2 grids) | Grid size (w3 × h3 pixels) |
|---|---|---|
| 80 × 80 pixels (small) | 8 × 8 grids | 10 × 10 pixels |
| 160 × 160 pixels (medium) | 8 × 8 grids | 20 × 20 pixels |
| 320 × 320 pixels (large) | 8 × 8 grids | 40 × 40 pixels |

In action 210, CPU 102 saves the average RGB values of the micro-object and its grids in database 108. In some implementations, database 108 comes with pre-indexed micro-objects and CPU 102 only indexes new micro-objects added by the user.

In action 212, CPU 102 saves the micro-object in multiple resolutions in database 108. In one implementation, CPU 102 saves the micro-object in four resolutions of high (e.g., 320×320 pixels), medium (e.g., 160×160 pixels), low (e.g., 80×80 pixels), and preview (e.g., 32×32 pixels, 16×16 pixels, or 8×8 pixels). Of course, method 200 can be repeated to add additional micro-objects to database 108.

Figure 3:
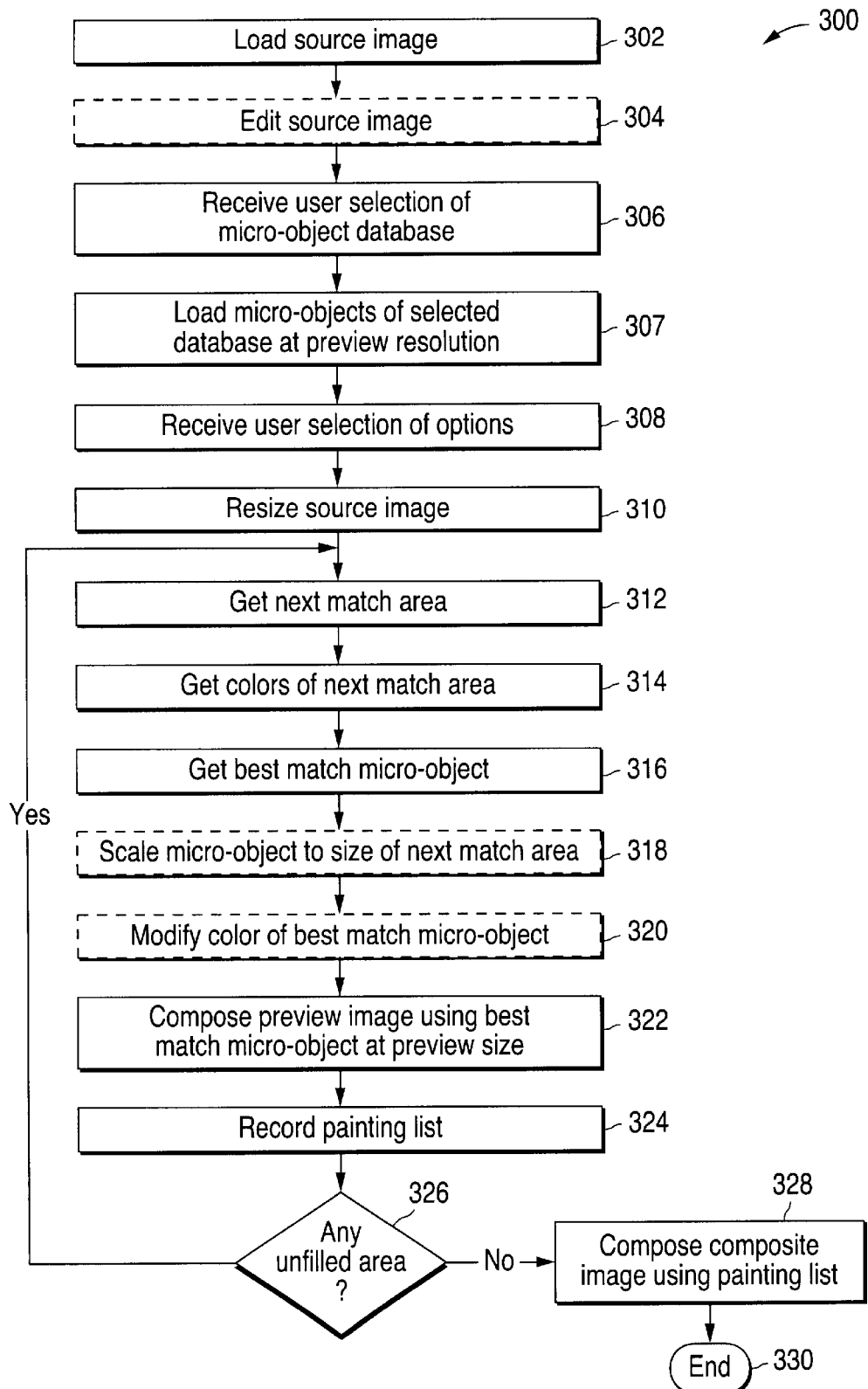
FIG. 3 is a flow chart illustrating a method for generating the composite image in one embodiment of the invention.

FIG. 3 illustrates a method 300 for generating a composite image from micro-objects in accordance with another aspect of the invention. In action 302, CPU 102 loads to memory 104 a user-selected source image. In one embodiment, the source image is an existing file in hard drive 105 of computer 100. In another embodiment, the source image is a file that the user provides via disk drive 112 or downloads from the Internet. In action 304, CPU 102 optionally edits the source image under the commands of the user using the previously described conventional imaging software on computer 100.

In action 306, CPU 102 receives a user's selection for a micro-object database (e.g., database 108) to be used in a composite image of the source image. In one embodiment, micro-object database 108 contains as few as one micro-object or as many as a conventional computer software needs to build a composite image. In action 307, CPU 102 loads all of the micro-objects at preview resolution in the selected database into memory 104. As the preview resolution is small, memory 104 can accommodate a large number of micro-objects at preview resolution. This allows CPU 102 to quickly process and display any selected micro-object on monitor 110.

In action 308, CPU 102 receives a selection by the user of the available options. These options include the output size (e.g., pixel resolution) of the composite image, the micro-object size (e.g., small, medium, or large), the use of multi-layering (e.g., overlay on top or bottom), and the use of color variation (e.g., on or off). In one embodiment, the user selects output size by specifying a width w4 and a height h4 in pixel resolution (e.g., 4800×4800 pixels).

In action 310, CPU 102 conventionally resizes (e.g., scales) the source image. In one embodiment, CPU 102 resizes the source image so each pixel of the resized source image corresponds to (e.g., represents) a predetermined number of pixels of the composite image. In this embodiment, each pixel of the resized source image also corresponds to the same predetermined number of pixels of the micro-object so there is a one-to-one correspondence between the pixels of the composite image and the pixels of the micro-object. In one implementation, CPU 102 resizes the source image so each pixel of the resized source image corresponds to ten-by-ten pixels of the composite image and the micro-object. For example, where the output size of the composite image is 4800×4800 pixel, the source image is resized to a resolution of 480×480 pixels. The original size of the source image can be smaller or larger than the output size of the composite image chosen by the user.

In action 312, CPU 102 searches for an area ("next match area") on the resized source image that has not been filled. In an exemplary embodiment of the invention, a routine called "FindNextMatchArea" finds the next area on the resized source image. This routine selects the next match area based on the largest unfilled area within a bounding box and the closest location of the bounding box to the center of the resized source image. The filled areas are flagged accordingly so that the routine can find the maximum unfilled area. Pseudo code for one embodiment of this routine is attached in Appendix A.

Figure 6:
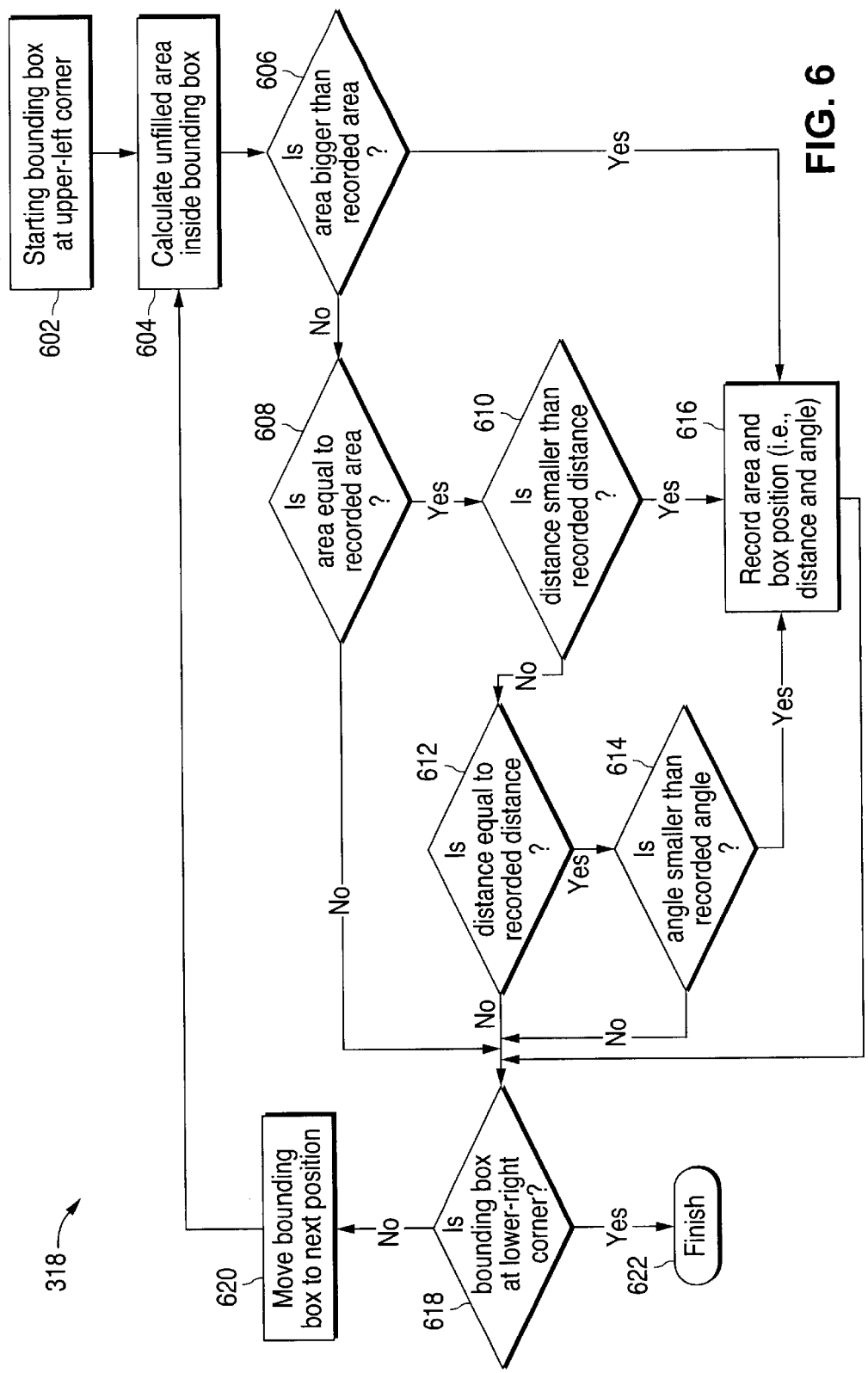
FIG. 6 is a flow chart illustrating an action of the method in FIG. 3.
Figure 7A:
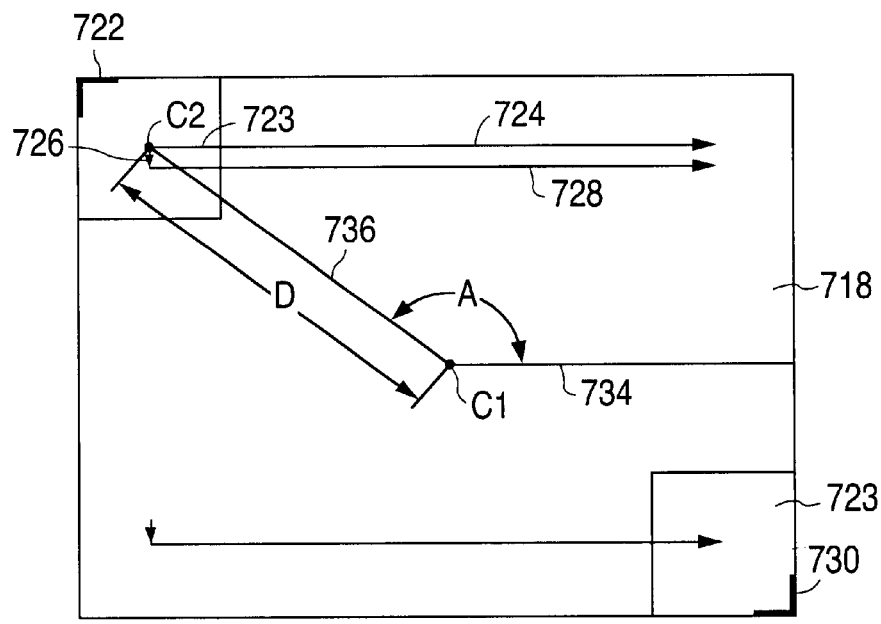
FIG. 7A is a block diagram illustrating a resized source image used in the method of FIG. 6.

FIG. 6 is a flow chart of the "FindNextMatchArea" routine in Appendix A. In action 602, CPU 102 starts searching for the next match area from the left-upper corner (e.g., corner 722 in FIG. 7A) of the resized source image (e.g., resized source image 718 in FIG. 7A). In one embodiment, CPU 102 moves the bounding box (e.g., box 723 in FIG. 7A) over the resized source image from left to right (e.g., path 724 in FIG. 7A) at increments of one pixel. When CPU 102 has reached the right edge of the resized source image, CPU 102 moves the bounding box downward by one pixel (e.g., path 726 in FIG. 7A) and then restarts the search from the left to the right of the resized source image (e.g., path 728 in FIG. 7A). CPU 102 continues this pattern until the bounding box reaches the lower-right corner (e.g., corner 730 in FIG. 7A) of the resized source image. In one implementation, the size of the bounding box is such that each pixel of the resized source image within the bounding box corresponds to the predetermined number of pixels of the micro-object so that each pixel of the micro-object eventually becomes one pixel of the composite image. Examples of the sizes of the bounding box are provided in the following table:

TABLE 2

| Micro-object size (w1 × h1 pixels) | Number of Grids (w2 × h2 grids) | Bounding box size (pixels of the resized source image) |
| --- | --- | --- |
| 80 × 80 pixels (small) | 8 × 8 grids | 8 × 8 pixels |
| 160 × 160 pixels (medium) | 8 × 8 grids | 16 × 16 pixels |
| 320 × 320 pixels (large) | 8 × 8 grids | 32 × 32 pixels |

Figure 7B:
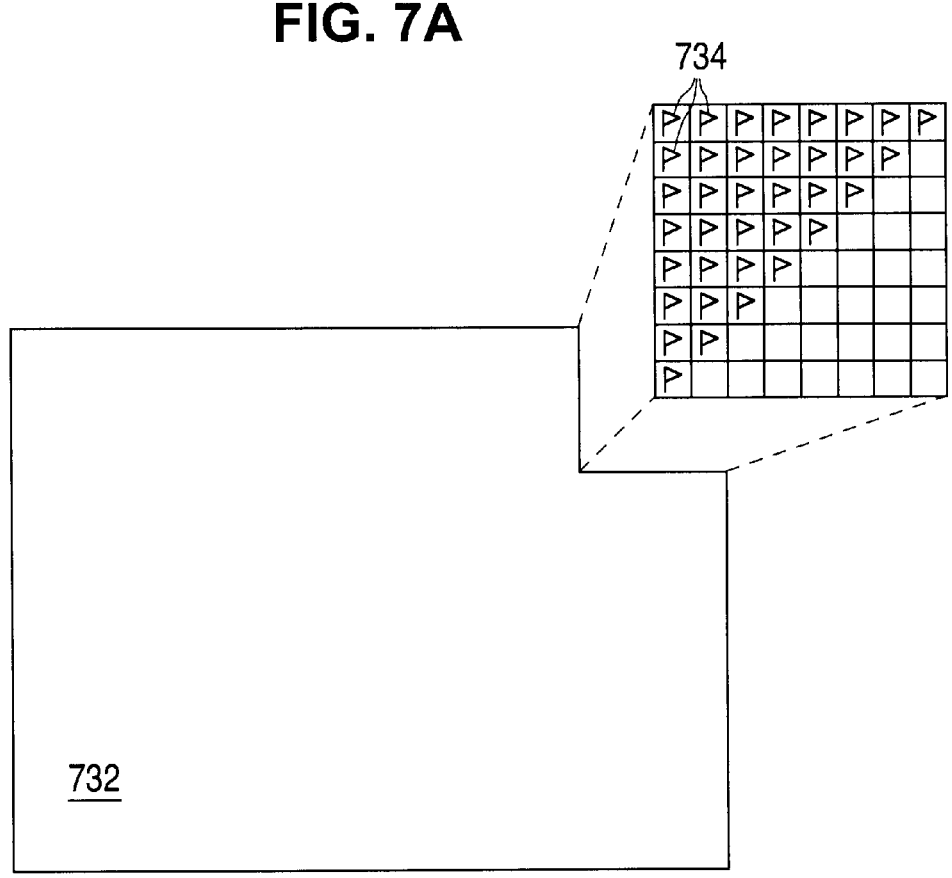
FIG. 7B is a block diagram illustrating a mask of the resized source image used in the method of FIG. 6.

In action 604, CPU 102 calculates the unfilled area inside the bounding box at the current location. CPU 102 keeps in memory 104 a mask (e.g., graphically represented as mask 732 in FIG. 7B) of the resized source image where each pixel of the resized source image can be flagged (e.g., graphically represented as flags 734 in FIG. 7B) if the pixel is filled. To calculate the unfilled area, CPU 102 counts the pixels within the bounding box that have not been flagged.

In action 606, CPU 102 determines whether the unfilled area inside the bounding box at the current location is bigger than the unfilled area recorded from one of the previous iterations through this routine. If so, action 606 is followed by action 616. Otherwise, action 606 is followed by action 608. CPU 102 initializes the unfilled area recorded from the previous iteration as zero at the start of this routine.

In action 608, CPU 102 determines whether the unfilled area inside the bounding box at the current location is equal to the unfilled area recorded from one of the previous iterations through this routine. If so, action 608 is followed by action 610. Otherwise, action 608 is followed action 618.

In action 610, CPU 102 determines whether the distance (e.g., distance D in FIG. 7A) from the center of the bounding box (e.g., center C1 in FIG. 7A) to the center of the resized source image (e.g., center C2 in FIG. 7A) is smaller than the distance recorded from one of the previous iterations through this routine. If so, action 610 is followed by action 616. Otherwise, action 610 is followed by action 612.

In action 612, CPU 102 determines whether the distance from the center of the bounding box to the center of the resized source image is equal to the distance recorded from one of the previous iterations through this routine. If so, action 612 is followed by action 614. Otherwise, action 612 is followed by action 618.

In action 614, CPU 102 determines whether the angle (e.g., angle A in FIG. 7A) formed between a reference line (e.g., line 734 in FIG. 7A) and a line (e.g., line 736 in FIG. 7A) connecting the center of the bounding box to the center of the resized source image is smaller than the angle recorded from one of the previous iterations through this routine. If so, action 614 is followed by action 616. Otherwise, action 614 is followed by action 616.

In action 616, CPU 102 records the size of the area, the distance, and the angle of the current location of the bounding box. These recorded values will be used for comparison in the next iteration through this routine. Action 616 is followed by action 618.

In action 618, CPU 102 determines whether the bounding box is at the lower-right corner (e.g., corner 730 in FIG. 7A) of the resized source image. If so, action 618 is followed by action 622. Otherwise, action 618 is followed by action 620. The bounding box is at the lower-right corner of the resized source image when CPU 102 has searched the entire resized source image.

In action 620, CPU 102 moves the bounding box to the next position. As previously described, CPU 102 moves the bounding box from left to right one pixel at a time. Once reaching the right edge of the resized source image, CPU 102 moves the bounding box from left to right by one pixel and restarts the search from the top. Action 620 is followed by action 604, and the routine cycles until the entire resized source image has been searched.

In action 622, CPU 102 ends this routine because it has located the next match area that has the largest unfilled area and is located closest to the center of the resized source image by distance and angle.

Returning to action 314 of FIG. 3, CPU 102 loads the color values from the next match area into memory 104. In action 316, CPU 102 finds a micro-object from database 108 that best matches the next match area ("best match micro-object"). In an exemplary embodiment of the invention, a routine called "FindBestMatchObject" finds the "best match" micro-object. This routine finds the best match micro-object with the minimum visual color difference from the area to be filled. Pseudo code for one embodiment of this routine is found in the attached Appendix B.

Figure 8:
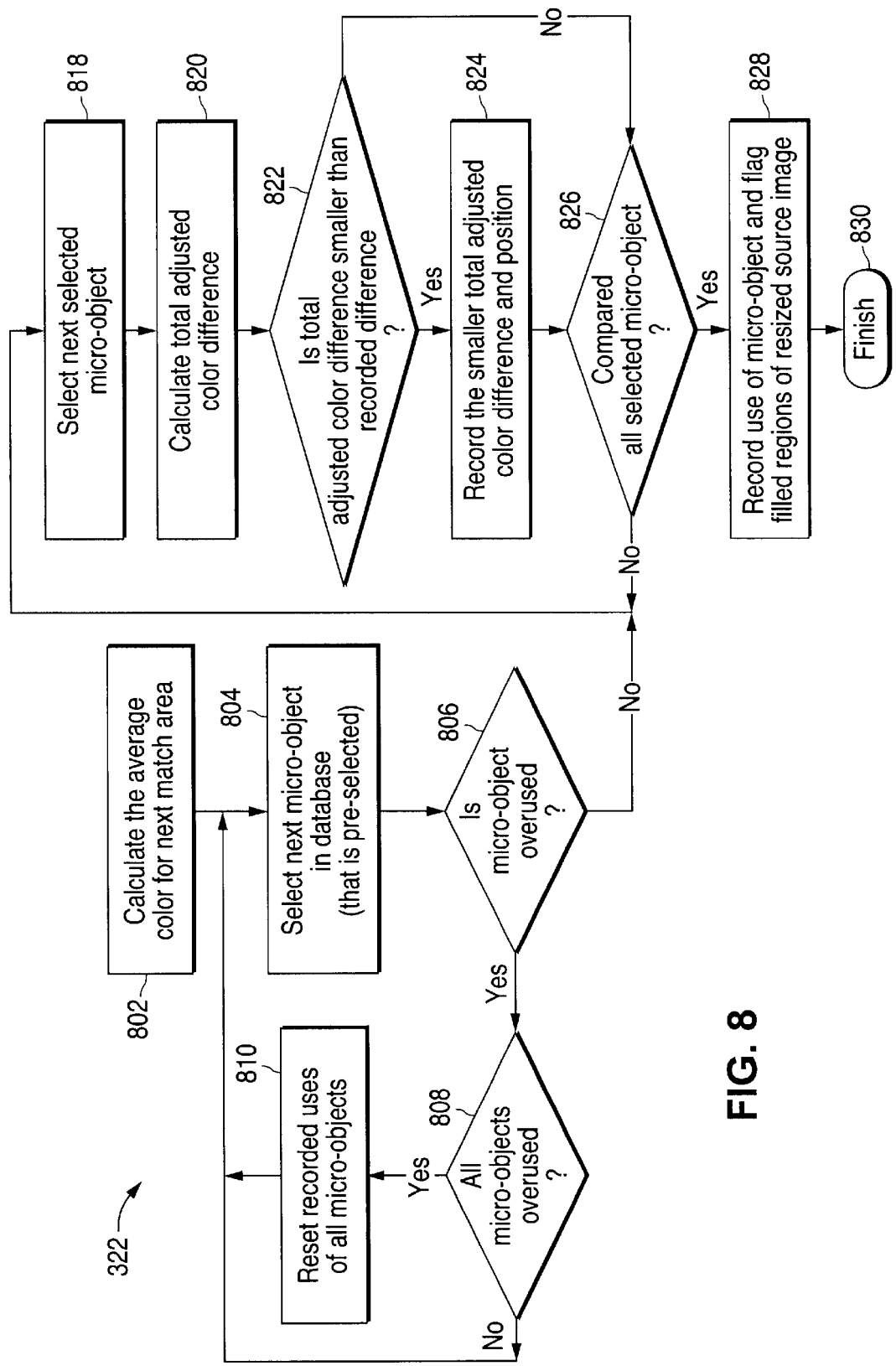
FIG. 8 is a flow chart illustrating another action of the method in FIG. 3.

FIG. 8 illustrates a flow chart of the "FindBestMatchObject" routine in Appendix B. In action 802, CPU 102 calculates the average red, average green, and average blue values (e.g., avgR0, avgG0, and avgB0) of the next match area by summing the red, green, and blue values of the pixels in the next match area and dividing the sum of each color value by the total number of pixels in the next match area.

In a first pass through action 804, CPU 102 selects a first micro-object from database 108. In subsequent passes through action 804, CPU 102 selects a next micro-object from database 108. In action 804, CPU 102 loads into memory 104 the indexed color values of the micro-object. In one embodiment of action 804, CPU 102 only selects from micro-objects in database 108 that are pre-selected to speed up the search process. In this optional pre-selection process, CPU 102 calculates the mean square difference (hereafter "average red, green, and blue mean square difference") between the average colors of the next match area and each of the micro-object in database 108. CPU 102 then selects a predetermined number of the micro-objects ("pre-selected micro-objects") from database 108 that have smaller mean square differences. In one implementation, the predetermined number is 10 to 20 percent of the total number of micro-objects in database 108.

In action 806, CPU 102 determines whether the current micro-object has been used over a predetermined number of times (i.e., if the micro-object has been overused). In one embodiment, CPU 102 records the number of times each micro-object in database 108 has been used. CPU 102 determines whether or not the times recorded use of the current micro-object exceeds the predetermined number of times. If a micro-object has been overused, action 806 is followed by action 808. Otherwise, action 806 is followed by action 818.

In action 808, CPU 102 determines whether all the micro-objects in database 108 have been overused. If so, action 808 is followed by action 810. Otherwise, action 808 is followed by action 804, where CPU 102 selects the next micro-object from database 108. In action 810, CPU 102 resets the recorded uses of all micro-objects so that they can all be reused once again. Action 810 is followed by action 804, where CPU 102 selects the first (instead of the next) micro-object from database 108.

In a first pass through action 818, CPU 102 selects a first micro-object from the pre-selected micro-objects. In subsequent passes through action 804, CPU 102 selects a next micro-object from the pre-selected micro-objects.

In action 820, CPU 102 calculates the total adjusted color difference if the user has selected color variation in action 314. In one embodiment where the user has selected to use small micro-objects, CPU 102 calculates the adjusted color difference for each pixel in the next match area with the following formula:

$$\text{Adjusted color difference} = A^2(R-R0+\text{avg}R0-\text{avg}R)^2 + A^2(G-G0+\text{avg}G0-\text{avg}G)^2 + A^2(B-B0+\text{avg}B0-\text{avg}B)^2 \quad \text{equation 1}$$

where R, G, B, A are the indexed red, blue, green, and alpha values of a grid of the micro-object that is not completely transparent; R0, G0, and B0 are the red, green, and blue values of a pixel of the next match area that corresponds to the grid of the micro-object; avgR0, avgG0, and avgB0 are the average red, green, and blue values of the next match area; and avgR, avgG, and avgB are the average red, green, and blue values of the micro-object. CPU 102 then adds the adjusted color difference of all the pixels in the next match area to form the total adjusted color difference for the current micro-object.

In one implementation where the micro-objects do not include an alpha value, the CPU 102 calculates the adjusted color difference for each pixel in the next match area with the following formula:

$$\text{Adjusted color difference} = (R-R0+\text{avg}R0-\text{avg}R)^2 + (G-G0+\text{avg}G0-\text{avg}G)^2 + (B-B0+\text{avg}B0-\text{avg}B)^2 \quad \text{Equation 2}$$

In another embodiment where the user has selected to use medium micro-objects, CPU 102 uses the equations above except that each grid of the medium micro-object corresponds to 2×2 pixels of the resized source image so that there is a one-to-one correspondence between the pixels of the micro-object and the pixels of the composite image. Thus, R0, G0, and B0 are average color values of all 2×2 pixels of the next match area that corresponds to the grid of the micro-object. In yet another embodiment where the user has selected to use large micro-objects, CPU 102 uses the same equations above except that each grid of the medium micro-object corresponds to 4×4 pixels of the resized source image so that there is a one-to-one correspondence between the pixels of the micro-object and the pixels of the composite image. Thus, R0, G0, and B0 are average color values of all 4×4 pixels of the next match area that corresponds to the grid of the micro-object. One example of the correspondence between the number of pixels in the resized source image to the grid of each micro-object is provided in the table below:

TABLE 3

| Micro-object size | Number of micro-object pixels in each grid | Number of resized source image pixels that corresponds to each grid |
| --- | --- | --- |
| 80 × 80 pixels (small) | 10 × 10 pixels | 1 pixel |
| 160 × 160 pixels (medium) | 20 × 20 pixels | 2 × 2 pixels |
| 320 × 320 pixels (large) | 40 × 40 pixels | 4 × 4 pixels |

In yet another embodiment where the user does not select color variation, CPU 102 calculates the total RGB mean square difference as described in application Ser. No. 09/394,115, filed Sept. 10, 1999, entitled "AUTOMATED PICTURE MONTAGE METHOD AND APPARATUS", which is incorporated by reference herein in its entirety.

In action 822, CPU 102 determines whether the total adjusted color difference is smaller than the total adjusted color difference recorded from one of the previous iterations through this routine. If so, action 822 is followed by action 824. Otherwise, action 822 is followed by action 826. CPU 102 initializes the recorded total adjusted color difference to be a large number (e.g., 256×2560) at the start of the routine. In action 824, CPU 102 records the smaller total adjusted color difference and the identity of the micro-object that generated the smaller total adjusted color difference. In action 826, CPU 102 determines whether all the pre-selected micro-objects have been compared. If so, action 826 is followed by action 828.

Otherwise, action 826 is followed by action 818, where CPU 102 selects the next micro-object from the pre-selected micro-objects. The last recorded micro-object is the best match micro-object when CPU 102 has compared all of the pre-selected micro-objects.

Also in action 828, CPU 102 flags all the pixels in the mask (e.g., mask 732 in FIG. 7B) of the resized source object that will be replaced with a grid of the best match micro-object so that these flagged pixels will not be considered when CPU 102 looks for the next match area in action 312. In one embodiment, where overuse of particular micro-objects are not wanted, CPU 102 also records the use of each micro-object to prevent overuse of any particular micro-object. In action 830, CPU 102 ends this routine.

Returning to action 318 of FIG. 3, CPU 102 optionally scales the micro-object to the size of the bounding box. The size of the bounding box depends on the size of the micro-object selected by the user (see Table 2). If the preview resolution of the micro-object is greater than the size of the bounding box, CPU 102 must scale the micro-object from its preview size to the size of the bounding box. For example, if the user selects small micro-objects and the preview resolution is 32×32 pixels, CPU 102 scales the micro-object from its preview size to the size of the bounding box used for small micro-objects (e.g., 8×8 pixels). As the preview resolution of the micro-object is low, CPU 102 can scale the preview resolution faster than CPU 102 can scale the small, medium, and large versions of the micro-objects. In the above example, if the preview resolution is 8×8 pixels, CPU 102 would not need to scale the micro-object.

In action 320, CPU 102 optionally modifies the colors of the best match micro-object if the user has selected color variation. CPU 102 modifies the color values of each non-transparent pixel of the best match micro-object using the following formula:

$$\text{Adjusted red} = r + (\text{avg}R0 - \text{avg}R) \quad \text{Equation 3}$$

$$\text{Adjusted green} = g + (\text{avg}G0 - \text{avg}G) \quad \text{Equation 4}$$

$$\text{Adjusted blue} = b + (\text{avg}B0 - \text{avg}B) \quad \text{Equation 5}$$

where adjusted red, adjusted green, and adjusted blue are the red, green, and blue values of the pixel are to be displayed; r, g, and b are the original red, green, and blue values of the pixel; avgR0, avgG0, and avgB0 are the average red, green, and blue values of next match area in the source object; and avgR, avgG, and avgB are the average red, green, and blue values of the best match micro-object.

In action 322, CPU 102 composes a preview image by filling the next match area on the resized source image with the best match object. CPU 102 optionally displays the preview image on monitor 110 as the preview image is being filled by micro-objects. Alternatively, CPU displays the preview image on monitor 110 once the preview image has been completely filled with micro-objects.

CPU 102 fills in only the portions of the resized source image corresponding to pixels of the best match micro-object that are not transparent. If a pixel of the micro-image has an alpha value, that pixel will be blended with the color values of a pixel that is already present (e.g., a pixel of the background or another micro-image).

In one embodiment, the user chooses as an option to fill micro-objects from above or below (e.g., overlay above or below) other micro-objects that were previously filled. If the user chooses to fill micro-objects from above previously filled micro-objects, CPU 102 will replace existing pixels from previously filled micro-objects with pixels from the best match micro-object. If the user chooses to fill micro-objects below previously filled micro-objects, CPU 102 will only fill in areas where the pixels are unfilled by other micro-objects.

Figure 5D:
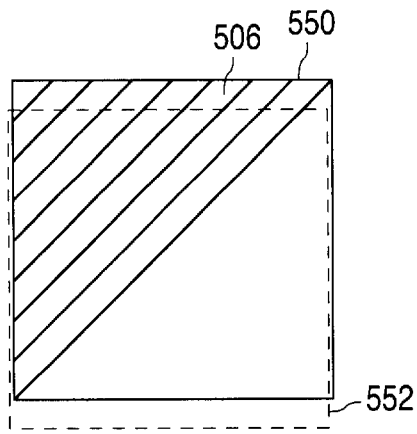
FIGS. 5D, 5E, and 5F are block diagrams illustrating the overlay of micro-objects used in the methods of FIGS. 2, 3, and 4.
Figure 5E:
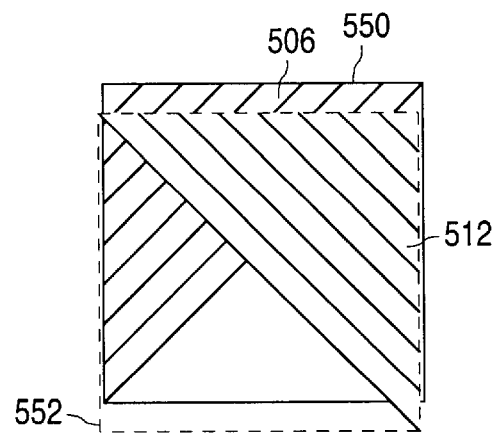
Figure 5F:
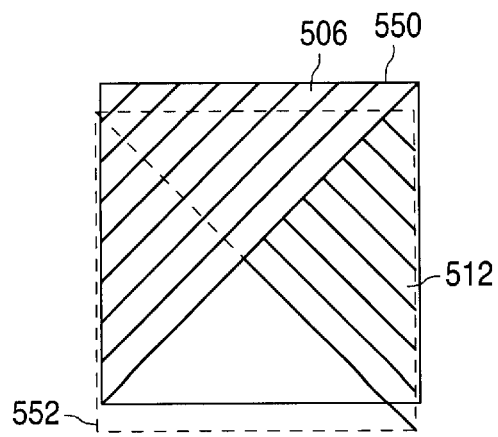

FIGS. 5D through 5F illustrate examples of action 322. As shown in FIG. 5D, CPU 102 placed non-transparent portion 506 of micro-object 502 (FIG. 5A) into an area 550 (indicated by a solid box) of the resized source image. Assuming that CPU 102 determines that an area 552 (indicated by a dashed box) located below area 550 is the next match area and that micro-object 508 (FIG. 3B) is the best match micro-object, CPU fills area 552 with non-transparent portion 512 of micro-object 508. As shown in FIG. 5E, CPU 102 also fills any corresponding region of area 552 with the pixels from the micro-object 308 if the user selects to fill from above (e.g., overlay on top). As shown in FIG. 5F, CPU 102 only fills corresponding regions of area 552 unfilled by micro-object 502 if the user selects filling from below (e.g., layer from beneath).

In action 324, CPU 102 records the location of the next match area and the identity of the best match micro-object in a painting list that is used later to compose the composite image in the same order. In one implementation, CPU 102 records the top left corner of the next match area (e.g., by its X and Y coordinates in pixels) as its location. CPU 102 also records the selected options received from the user in action 214 in the painting list (e.g., overlay on top or bottom, micro-object size, and color variation on or off).

In action 326, CPU 102 determines whether there are any unfilled areas left. If so, action 326 is followed by action 312 and method 300 cycles until all the unfilled areas have been filled with micro-objects. Otherwise, action 326 is followed by action 328. In one embodiment, CPU 102 determines if there are any unfilled areas left by checking if a predetermined percentage (e.g., 10 percent) of the pixels of the resized source image have been flagged. In another embodiment, CPU 102 checks whether all the pixels of the resized source image have been flagged in memory 104.

Figure 4:
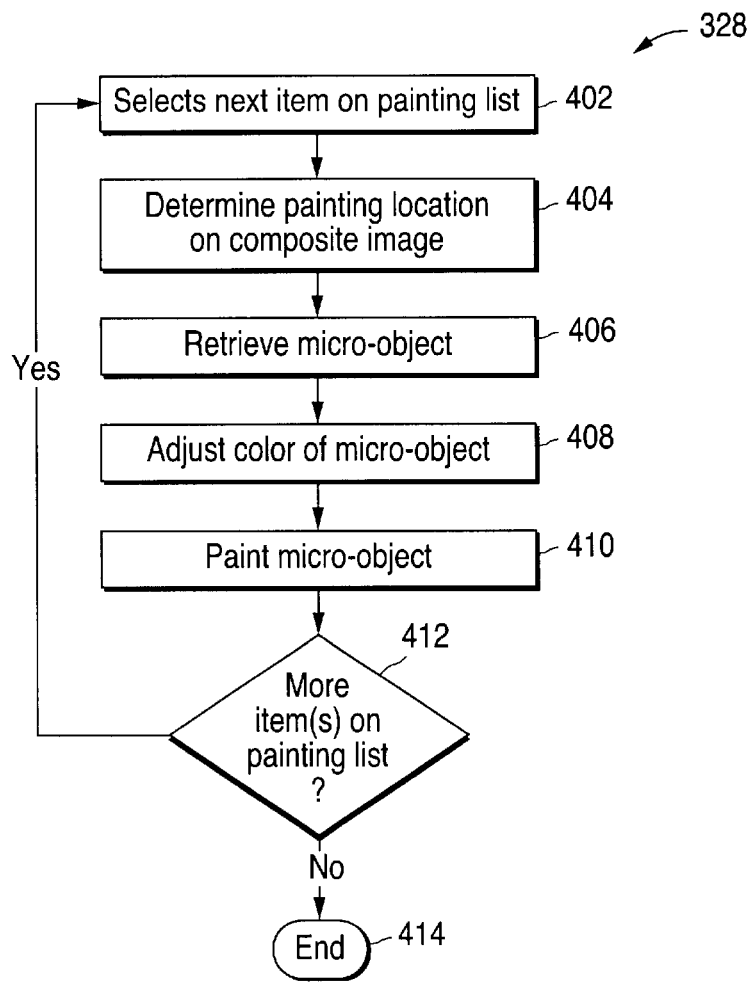
FIG. 4 is a flow chart illustrating a method for composing the composite image using a painting list.

In action 328, CPU 102 composes and optionally displays the composite image using the painting list. An embodiment of action 328 is illustrated in FIG. 4.

In action 402 (FIG. 4), CPU 102 selects the next item (i.e., the location of the next match area on the resized source image and the identity of the micro-object) on the painting list. In a first pass through action 402, CPU 102 selects the first item on the painting list.

In action 404, CPU 102 uses the recorded location of the next match area on the resized source image to determine the corresponding location on the composite image to be filled with the recorded best match micro-object. For example, if the recorded location is 20th pixel in the X direction and 20th pixel in the Y direction on the resized source image and the resized source image is 1/10th the size of the composite image, the corresponding location on the composite image is the 200th pixel in the X direction and the 200th pixel in the Y direction.

In action 406, CPU 102 retrieves the micro-object at the selected size from database 108. In action 408, CPU 102 adjusts the color of each pixel of the micro-object as in action 320.

In action 410, CPU 102 paints the corresponding area on the composite image with the micro-object. As in action 322, if the user chooses to fill micro-objects above previously filled micro-objects (overlay on top), CPU 102 will replace any existing pixels from previously filled micro-objects with pixels from the current micro-object. If the user chooses to fill micro-objects below previously filled micro-objects (overlay on bottom), CPU 102 will only fill in areas where the pixels are unfilled by other micro-objects.

In action 412, CPU 102 determines if there are any remaining items on the painting list. If so, action 412 is followed by action 402 and action 328 cycles until all items on the painting list have been painted. Otherwise, action 412 is followed by action 414 that ends action 328. Of course, CPU 102 can also print the composite image prior to ending action 328.

Figure 9:
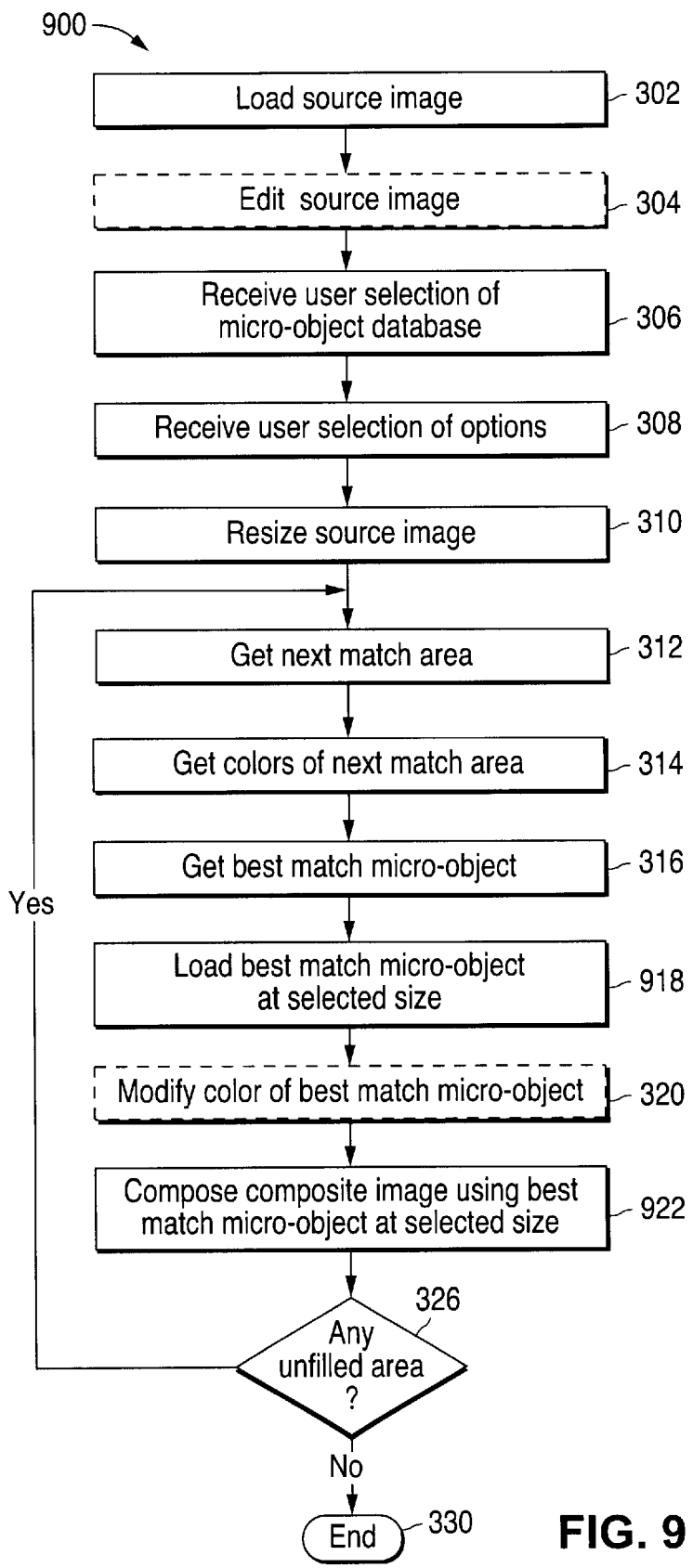
FIG. 9 is a flow chart illustrating a method for generating the composite image in another embodiment of the invention.

FIG. 9 illustrates a method 900 for generating the composite image from micro-objects in accordance with another aspect of the invention. Method 900 is the same as method 300 except for deletion of actions 307, 324, and 328, substitution of action 918 for action 318, and substitution of action 922 for action 322. Method 900 generates the composite image without first providing the user a preview image. Accordingly, a painting list is not generated in method 900.

In action 918, CPU 102 loads the best match micro-object at the size selected by the user in action 308. In action 922, CPU 102 composes the composite image using the best match micro-object at the selected size. In one implementation, action 922 includes actions 404 and 410 of FIG. 4, where CPU 102 determines the painting location on the composite image and paints the micro-object onto the composite image.

Although the invention has been described with reference to particular embodiments, the description is only an example of the invention's application and should not be taken as a limitation. Various other adaptations and combinations of features of the embodiments disclosed are within the scope of the invention as defined by the following claims.

APPENDIX A

```
/*****
This FindNextMatchArea ( ) function will find the next maximal
unfilled area inside a fixed rectangle. If it finds two rectangles
with the same area, it will compare the distance to the center and
then the angle between them.
```

APPENDIX A-continued

```
LPBYTE lpMask    Input only. Each byte represents a mask value in
                 the target image grid GridW x GridH with value
                 1 for filled area and 0 for unfilled area.
LPRECT lpRect    Output only. If the unfilled area is found, it
                 represents the object bounding box corre-
                 sponding to the grid GridW x GridH.
Return value     Return TRUE (1) if an unfilled area is found.
******/
BOOL FindNextMatchArea( LPBYTE lpMask, LPRECT lpRect )
{
    long GridH, GridW, Width, Height, nh, nw, nPer, nSum;
    long H0, W0, tempH0, tempW0, nSum, nTemp, temD, nDist, temA,
nAng, CH0, CW0;
    BOOL bRecordIt;
    // get the global settings
    GridH = GridHeight;
    GridW = GridWidth;
    Height = RectangleHeight;
    Width = RectangleWidth;
    nPer = nFillPercent * Height * Width / 100; // the percent of the area
considered small
    CH0 = (GridH-Height) / 2; // the center of grid
    CW0 = (GridH-Width) / 2;
    nSum = 0;
    for( tempH0=0; tempH0 < GridH-Height; tempH0++)
    for( tempW0=0; tempW0 < GridW-Width; tempW0++)
    {
      nTemp = 0;
      for( nh=tempH0; nh<tempH0+Height; nh++)
      {
        for( nw=tempW0; nw<temp0+Width; nw++)
        {
          if( *(lpMask+nw+nh*GridH) == 0) // if it's
unfilled, add the area
            nTemp++;
        }
      }
      bRecordIt = FALSE;
      if( nTemp > nSum ) // if find a bigger unfilled area, record it
        bRecordIt = TRUE;
      else if( nTemp == nSum ) // if same area, compare the distance
      from center
      {
        temD = (tempH0-CH0) *(tempH0-CH0) + (tempW0-CH0)
*(tempW0-CH0);
        nDist = (H0-CH0) *(H0-CH0) + (W0-CH0) *(W0-CH0);
        if( temD < nDist ) // if the distance from center is smaller,
record it
          bRecordIt = TRUE;
        else if( temD == nDist ) // if same distance, compare the
angle
        {
          temA = arctan((tempH0-CH0) /(tempW0-CH0));
          nAng = arctan((H0-CH0)/(W0-CH0));
          if( temA <= nAng ) // if the angle is smaller, record it
            bRecordIt = TRUE;
        }
      }
      if( bRecordIt )
      {
        nSum = nTemp;
        H0 = tempH0;
        W0 = tempW0;
      }
    }
    if( nSum <= nPer) // all area are filled (except some small percent).
      return FALSE;
    // now fill the output Rect
    lpRect->left = W0;
    lpRect->right = W0+Width;
    lpRect->top = H0;
    lpRect->bottom = H0+Height;
    return TRUE;
}
```

APPENDIX B

```
//this is for constant and structure definition
#define GRID_W  8
#define GRID_H  8
#define GRID_T ( GRID_W * GRID_H )
typedef struct tagMONTAGEDATAHEADER
{
DWORD  dwFileNum;      // file sequence number
DWORD  dwLocation;     // file location
DWORD  dwFlags;        // flags for usage
DWORD  dwColor;        // Average color in BGRM order
DWORD  dwChoiceFlag;   // image usage flag
DWORD  dwReserved;     // reserved for internal control
}MONTAGEDATAHEADER;
typedef MONTAGEDATAHEADER FAR *
LPMONTAGEDATAHEADER;
#define MONTAGE_SIZE (4 * GRID_T +
sizeof(MONTAGEDATAHEADER)
)
// color data in BGRM order followed after the header
/*****
This FindBestMatchObject( ) function will find the best-matched
object in the selected montage database with minimal average
adjusted color square difference in the specific location.
LPBYE lpColor    Input only. It represents color data in GRID_W x
                 GRID_T in BGR order.
LPBYTE lpData    Input and output. It holds
                 MONTAGEDATAHEADER and the object data
                 information.
long Tot         Total objects in the selected montage database.
long W0, H0      The starting position of unfilled area.
long GridW,      The image grid size.
GridH
LPBYTE lpMask    Input and output. Each byte represents a mask
                 value in the target image grid GridW x GridH
                 with value 1 for filled area and 0 for unfilled area.
                 It will fill value 1 for the best-matched object.
Return value     Return the position of the best-matched object file.
******/
long FindBestMatchObject( LPBYTE lpColor, LPBYTE lpData, long Tot,
   long W0, long H0, long GridW, long GridH, LPBYTE lpMask )
{
   long Flag, Diff, Min, Sum, Pos, i, j, nR, nG, nB, Offset,
      avgR,avgG,avgB,avgR0,avgG0,avgB0;
   LPBYTE lpVal, lpT;
   LPMONTAGEDATAHEADER lpmhdr;
Pos = 0;
Min = 256*2560;
// calcucate the average color
nB = nG = nR = 0;
for(j = 0; j < GRID_T; j++)
{
   nB += (long)*(lpColor+4*j );
   nG += (long)*( lpColor+4*j+1);
   nR += (long)*( lpColor+4*j+2);
}
avgR0 = nR / GRID_T;
avgG0 = nG / GRID_T;
avgB0 = nB / GRID_T;
for( i = Offset = 0; i < Tot; i++ )
{
  lpmhdr = (LPMONTAGEDATAHEADER)(lpData + Offset);
  Offset += MONTAGE_SIZE;
  if( bColorVariation)
  {
    // get the average color of the object, find the diff
    avgB = avgB0 - GetBValue(lpmhdr->dwColor);
    avgG = avgG0 - GetGValue(lpmhdr->dwColor);
    avgR = avgR0 - GetRValue(lpmhdr->dwColor);
  }
  else
    avgB = avgG = avgR = 0;
  if (lpmhdr->dwChoiceFlag >= 3) // only check those images not ejected
  {
    Flag = lpmhdr->dwFlags;
    if( nMontageUsage >= Flag) // only check those images not over
used
    {
      Diff= 0;
      lpVal = (LPBYTE)lpmhdr +
      sizeof(MONTAGEDATAHEADER);
      lpT = lpColor;
      Sum = 0;
      for(j = 0; j < GRID_T;j++ )
      {
        if( *(lpVal+3)) // if the object is not transparent
there
        {
          // calculate the adjusted color difference
          nB = (long)*(lpVal ) - (long)*(lpT ) + avgB0-avgB;
          nG = (long)*(lpVal+1) - (long)*(lpT+1) + avgG0-avgG;
          nR = (long)*(lpVal+2) - (long)*(lpT+2) + avgR0-avgG;
          Diff += nR*nR + nG * nG + nB * nB; // sum of square diff
          Sum++;
        }
        lpVal += 4;
        lpColor += 4;
      }
      // calculate the average color difference, plus the init value
      Diff = Diff / max(1,Sum) + SetInitValue(Flag);
      if( Diff < Min ) // if a smaller difference is found, record it
      {
        Pos = i;
        Min = Diff;
      }
    }
  }
}
if( Min >= 256*2560 ) // no more object left
   return - 1;
lpmhdr = (LPMONTAGEDATAHEADER)(lpData + Pos * MONTAGE_SIZE);
lpmhdr->dwFlags += 1; // add the usage flag
FilePos = lpmhdr->dwFileNum;
// Now fill the mask with the best-matched object
lpVal = (LPBYTE)lpmhdr + sizeof(MONTAGEDATAHEADER);
for(j=0; j<GRID_H; j++)
{
  for( i=0; i<GRID_W; i++)
  {
    if( *(lpVal+3)) // if the object is not transparent at it's position
      *(lpMask+ (j + H0) * GridW + i + W0) = 1;
    lpVal += 4;
  }
}
return FilePos;
}
```

I claim:

1. A method for generating a composite image of a source image, comprising:

selecting a first area on the source image;

selecting a first image from a plurality of images stored in a database, the first image having color similar to the first area on the source image, the first image comprising at least one transparent region and one non-transparent region;

generating the composite image by at least partially filling a first area on the composite image that corresponds to the first area on the source image with a non-transparent region of the first image so that the first area on the composite image has at least one filled region and one unfilled region; and wherein said selecting a first image comprises choosing an image from the plurality of images with the smallest total adjusted color difference when compared to the first area on the source image, the first image being divided into parts, the total adjusted color difference being the sum of each, adjusted color difference between a part of the first image and a corresponding part of the first area on the source image, the adjusted color difference being defined as:

$$\text{Adjusted color difference} = A^2(R-R0+\text{avg}R0-\text{avg}R)^2 + A^2(G-G0+\text{avg}G0-\text{avg}G)^2 + A^2(B-B0+\text{avg}B0-\text{avg}B)^2$$

wherein R, G, B, and A are red, green, blue, and alpha values of a part of the first image; R0, G0, and B0 are red, green, and blue values of a part of the first area on source image that corresponds to the part of the first image; avgR0, avgG0, and avgB0 are average red, green, and blue values of the first area on the source image; and avgR, avgG, and avgB are average red, green, and blue values of the first image.

2. A method for generating a composite image of a source image, comprising:

selecting a first area on the source image;

selecting a first image from a plurality of images stored in a database, the first image having color similar to the first area on the source image, wherein the first image comprises at least one transparent region and one non-transparent region; and generating the composite image by at least partially filling a first area on the composite image that corresponds to the first area on the source image with a non-transparent region of the first image so that the first area on the composite image has at least one filled region and one unfilled region; and wherein said selecting a first image comprises choosing an image from the plurality of images with the smallest total adjusted color difference when compared to the first area of the source image, the firs images being divided into parts, the total adjusted color difference being the sum of each adjusted color difference between a part of the first image and a corresponding part of the first area on the source image, the adjusted color difference being defined as:

$$\text{Adjusted color difference} = (R-R0+\text{avg}R0-\text{avg}R)^2 + (G-G0+\text{avg}G0-\text{avg}G)^2 + (B-B0+\text{avg}B0-\text{avg}B)^2$$

wherein R, G, and B are red, green, and blue values of the part of the first image; R0, G0, and B0 are red, green, and blue values of the corresponding part of the first area on source image; avgR0, avgG0, and avgB0 are average red, green, and blue values of the first area on the source image; and avgR, avgG, and avgB are average red, green, and blue values of the first image.

3. A method for generating composite image of a source image, comprising:

selecting a first area on the source image;

selecting a first image from a plurality of images stored in a database, the first image having color similar to the first area on the source image, wherein the first image comprises at least one transparent region and one non-transparent region; and generating the composite image by at least partially filling a first area on the composite image that corresponds to the first area on the source image with a non-transparent region of the first image so that the first are on the composite image has at least one filled region and one unfilled region; and wherein said selecting a first image comprises choosing an image from the plurality of images with the smallest total RGB mean square difference when compared to the first area of the source image.

4. The method of claim 1, wherein said selecting a first image further comprises, prior to said choosing an image, rejecting a predetermined number of images from the plurality of images that have large avenge red, green, and blue mean square differences when compared to the first area of the source image.

5. The method of claim 1, further comprising:

calculating the average red, green, and blue values of each of the plurality of images;

dividing each of the plurality of images into parts;

calculating the average red, green, and blue values of each part; and storing the average red, green and blue values of each of the plurality of images and their parts into the database.

6. The method of claim 2, wherein said selecting a first image further comprises, prior to said choosing an image, rejecting a predetermined number of images from the plurality of images that have large average red, green, and blue mean square differences when compared to the first area of the source image.

7. The method of claim 2, further comprising:

calculating the average red, green, and blue values of each of the plurality of images;

dividing each of the plurality of images into parts;

calculating the average red, green, and blue values of each part; and storing the average red, green, and blue values of each of the plurality of images and their parts into the database.

8. The method as in claim 1, 2, or 3, further comprising:

selecting a second area on the source image that at least partially overlaps an unfilled region of the first area on the source image;

selecting a second image from the plurality of images, the second image having color similar to the second area on the source image, wherein the second image comprises at least one transparent region and one non-transparent region; and generating the composite image by at least partially filling a second area on the composite image that corresponds to the second area on the source image with a non-transparent region of the second image so that the unfilled region of the first area on the composite image becomes at least partially filled with the non-transparent region of the second image.

9. The method as in claim 1, 2, or 3, wherein said selecting a first area on the source image comprises:

placing a bounding box over a plurality of areas over the source image;

calculating an unfilled area in the bounding box at each of the plurality of areas over the source image; and selecting an area from the plurality of areas over the source image that has the largest unfilled area.

10. The method as in claim 1,2, or 3, wherein said selecting a first image comprises choosing an image from the plurality of images that has not been selected over a predetermined number of times.

11. The method as in claim 1, 2, or 3, further comprising adjusting the color of the first image to resemble the color of the first area on the source image prior to said generating the composite image.

12. The method of claim 8, wherein said partially filling a second area on the composite image further comprises filling the second image in at least a portion of the second area on the composite image that has previously been filled by at least a portion of the non-transparent region of the first image.

13. The method of claim 8, wherein said partially filling a second area on the composite image further comprises filling the second image in the second area on the composite image that are unified by the first image.

14. The method of claim 9, wherein said calculating an unfilled area in the bounding box comprises:

maintaining a mask of the source image in which areas that are filled by images from the plurality of images are flagged; and summing areas in the bounding box that have not been flagged.

15. The method of claim 9, wherein said selecting a first area on the source image further comprises, if two or more areas from the plurality of areas have the largest unfilled area, selecting an area from the two or more areas that has the shortest distance to the center of the source image.

16. The method of claim 15, wherein said selecting a first area further comprises, if two or more areas from the plurality of areas have the largest unfilled area and the shortest distance to the center of the source image, selecting an area from the two or more areas that creates the smallest angle between a reference line and a line from the center of the area to the center of the source image.

17. The method of claim 11, wherein said adjusting the color of the first image comprises:

Adjusted red=$r$+(avg$R0$-avg$R$)

Adjusted green=$g$+(avg$G0$-avg$G$)

Adjusted blue=$b$+(avg$B0$-avg$B$)

wherein adjusted red, adjusted green, and adjusted blue are the red, green, and blue values of pixels of the first image to be displayed; r, g, and b are the original red, green, and blue values of the pixels of the first image that are not transparent; avgR0, avgG0, and avgB0 are the average red, green, and blue values of the first area on the source image; and avgR, avgG, and avgB are the average red, green, and blue values of the first image.

18. A method for generating a composite image of a source image, comprising:

selecting a first area on the source image;

selecting a first image from a plurality of images stored in a database, the first image having color similar to the first area on the source image;

adjusting the color of the first image to resemble the color of the first area on the source image;

generating the composite image by at least partially filling a first area on the composite image that corresponds to the first area on the source image with the first image as adjusted; and wherein said adjusting the color of the first image comprises calculating color values using the following equations:

Adjusted red=$r$+(avg$R0$-avg$R$)

Adjusted green=$g$+(avg$G0$-avg$G$)

Adjusted blue=$b$+(avg$B0$-avg$B$)

wherein adjusted red, adjusted green, and adjusted blue are the red, green, and blue values of pixels of the first image to be displayed; r, g, b are the original red, green, and blue values of the pixels of the first image that are not transparent; avgR0, avgG0, and avgB0 are the average red, green, and blue values of the first area on the source image; and avgR avgG, and avgB are the average red, green, and blue values of the first image.

19. The method of claim 18, further comprising:

selecting a second area on the source image;

selecting a second image from the plurality of images;

adjusting the color of the second image to resemble the color of the second area on the source image; and generating the composite image by at least partially filling a second area on the composite image that corresponds to the second area on the source image with the second image.

20. The method of claim 19, wherein said partially filling a second area on the composite image further comprises filling the second image in at least a portion of the second area on the composite image that has previously been filled by at least a portion of the non-transparent region of the first image.

21. The method of claim 19, wherein said partially filling a second area on the composite image further comprises filling the second image in the second area on the composite image that are unfilled by the first image.

22. The method of claim 18, wherein said selecting the a first area on the source image comprises:

placing a bounding box over a plurality of areas over the source image;

calculating an unfilled area in the bounding box at each of the plurality of areas over the source image; and selecting an area from the plurality of areas over the source image that has the largest unfilled area.

23. The method of claim 22, wherein said calculating an unfilled area in the bounding box comprises:

maintaining a mask of the source image, in which areas that are filled by images from the plurality of images are flagged; and summing areas in the bounding box that have not been flagged.

24. The method of claim 22, wherein said selecting a first area on the source image further comprises, if two or more areas from the plurality of areas have the largest unfilled area, selecting an area from the two or more areas that has the shortest distance to the center of the source image.

25. The method of claim 24, wherein said selecting a first area on the source image further comprises, if two or more areas from the plurality of areas have the largest unfilled area and the shortest distance to the center of the source image, selecting an area from the two or more areas that creates the smallest angle between a reference line and a line from the center of the area to the center of the source image.

26. The method of claim 18, wherein said selecting a first image comprises choosing an image from the plurality of images that has not be selected over a predetermined number of times.

27. The method of claim 18, wherein said selecting a first image comprises choosing an image from the plurality of images with the smallest total adjusted color difference when compared to the first area of the source image, the first image being divided into parts, the total adjusted color difference being the sum of each adjusted color difference between a part of the first image and a corresponding apart of the fist area on the source image, the adjusted color difference being defined as:

Adjusted color difference=$A^2(R-R0+\text{avg}R0-\text{avg}R)^2+A^2(G-G0+\text{avg}G0-\text{avg}G)^2+A^2(B-B0+\text{avg}B0-\text{avg}B)^2$ wherein R, G, B, and A are red, green, blue, and alpha values of the part of the first image; R0, G0, and B0 are red, green and blue values of the corresponding part of the first area on source image; avgR0, avgG0, and avgB0 are average red, green, and blue values of the first area on the source image; and avgR, avgG, and avgB are average red, green, and blue values of the first image.

28. The method of claim 27, wherein said selecting the first image further comprises, prior to said choosing an image, rejecting a predetermined number of images from the plurality of images that have large average red, green, and blue mean square differences when compared to the first area of the source image.

29. The method of claim 27, further comprising:
calculating the average red, green, and blue values of each of the plurality of images;
dividing each of the plurality of images into parts;
calculating the average red, green, and blue values of each part; and
storing the average red, green, and blue values of each of the plurality of images and their parts into the database.

30. The method of claim 18, wherein said selecting a first image comprises choosing an image from the plurality of images with the smallest total adjusted color difference when compared to the first area of the source image, the first image being divided into parts, the total adjusted color difference being the sum of each adjusted color difference between a part of the first image and a corresponding a part of the first area on the source image, the adjusted color difference being defined as:

$$\text{Adjusted color difference} = (R-R0+\text{avg}R0-\text{avg}R)^2 + (G-G0+\text{avg}G0-\text{avg}G)^2 + (B-B0+\text{avg}B0-\text{avg}B)^2$$

wherein R, G, and B are red, green, and blue values of a part of the first image; R0, G0, and B0 are red, green, and blue values of a part of the first area on source image that corresponds to the part of the first image; avgR0, avgG0, and avgB0 are average red, green, and blue values of the first area on the source image; and avgR, avgG, and avgB are average red, green, and blue values of the first image.

31. The method of claim 30, wherein said selecting a first image further comprises, prior to said choosing an image, rejecting a predetermined number of images from the plurality of images that have large average red, green, and blue mean square differences when compared to the first area of the source image.

32. The method of claim 30, further comprising:
calculating the average red, green, and blue values of each of the plurality of images;
dividing each of the plurality of images into parts;
calculating the average red, green, and blue values of each part; and
storing the average red, green, and blue values of each of the plurality of images and their parts into the database.

33. The method of claim 18, wherein said selecting a first image comprises choosing an image from the plurality of images with the smallest total RGB mean square difference when compared to the first area of the source image.

34. A method for generating a composite image of a source image, comprising:
providing a plurality of images saved in at least a first resolution and a second resolution, wherein the first resolution is higher than the second resolution;
selecting a first area on the source image, the first area on the source image being of the second resolution;
selecting a first image at the second resolution from the plurality of images stored in a database, the first image having color similar to the first area on the source image;
generating a preview image by at least partially filling the first area on the source image with the first image at the second resolution;
recording the identity of the first image and the location of the first area on the source image on a list; and
wherein said selecting the first image comprises choosing an image from the plurality of images with the smallest total adjusted color difference when compared to the first area on the source image, the total adjusted color difference being the sum of each adjusted color difference between a part of the first image and a corresponding part of the first area on the source image, the adjusted color difference being defined as:

$$\text{Adjusted color difference} = A^2(R-R0+\text{avg}R0-\text{avg}R)^2 + A^2(G-G0+\text{avg}G0-\text{avg}G)^2 + A^2(B-B0+\text{avg}B0-\text{avg}B)^2$$

wherein R, G, B, and A are red, green, blue and alpha values of the part of the first image; R0, G0, and B0 are red, green, and blue values of the corresponding part of the first area on source image; avgR0, avgG0, and avgB0 are average red, green, and blue values of the first area on the source image; and avgR, avgG, and avgB are average red, green, and blue values of the first image.

35. A method for generating a composite image of a source image, comprising:
providing a plurality of images saved in at least a first resolution and a second resolution, wherein the first resolution is higher than the second resolution;
selecting a first area on the source image, the first area on the source image being of the second resolution;
selecting a first image at the second resolution from the plurality of images stored in a database, the first image having color similar to the first area on the source image;
generating a preview image by at least partially filling the first area on the source image with the first image at the second resolution;
recording the identity of the first image and the location of the first area on the source image on a list; and
wherein said selecting a first image comprises choosing an image from the plurality of images with the smallest total adjusted color difference when compared to the first area of the source image, the first image being divided into parts, the total adjusted color difference being the sum of each adjusted color difference between a part of the first image and a corresponding part of the first area on the source image, the adjusted color difference being defined as:

$$\text{Adjusted color difference} = (R-R0+\text{avg}R0-\text{avg}R)^2 + (G-G0+\text{avg}G0-\text{avg}G)^2 + (B-B0+\text{avg}B0-\text{avg}B)^2$$

wherein R, G, and B are red, green, and blue values of the part of the first image; R0, G0, and B0 are red, green, and blue values of the corresponding part of the first area on source image; avgR0, avgG0, and avgB0 are average red, green, and blue values of the first area on the source image; and avgR, avgG, and avgB are average red, green, and blue values of the first image.

36. A method for generating a composite image of a source image, comprising:
providing a plurality of images saved in at least a first resolution and a second resolution, wherein the first resolution is higher than the second resolution;

selecting a first area on the source image, the first area on the source image being of the second resolution;

selecting a first image at the second resolution from the plurality of images stored in a database, the first image having color similar to the first area on the source image;

generating a preview image by at least partially filling the first area on the source image with the first image at the second resolution;

recording the identity of the first image and the location of the first area on the source image on a list; and wherein said selecting the first image comprises choosing an image from the plurality of images with the smallest total RGB mean square difference when compared to the first area of the source image.

37. The method of claim 34, wherein said selecting a first image further comprises, prior to said choosing an image, rejecting a predetermined number of images from the plurality of images that have large average red, green, and blue mean square differences when compared to the first area of the source image.

38. The method of claim 34, further comprising:

calculating the average red, green, and blue values of each of the plurality of images;

dividing each of the plurality of images into parts;

calculating the average red, green, and blue values of each part; and storing the average red green, and blue values of each of the plurality of images and their parts into the database.

39. The method of claim 35, wherein said selecting a first image further comprises, prior to said choosing an image, rejecting a predetermined number of images from the plurality of images that have large average red, green, and blue mean square differences when compared to the first area of the source image.

40. The method of claim 35, further comprising:

calculating the average red, green, and blue values of each of the plurality of images;

dividing each of the plurality of images into parts;

calculating the average red, green, and blue values of each part; and storing the average red, green, and blue values of each of the plurality of images and their parts into the database.

41. The method as in claim 34, 35, or 36, further comprising generating the composite image from the list by:

locating a first area on the composite image that corresponds to the first area on the source image; and at least partially filling the first area on the composite image with the first image at the first resolution.

42. The method as in claim 34, 35, or 36, further comprising:

selecting a second area on the source image that at least partially overlaps an unfilled region of the first area on the source image;

selecting a second image at the second resolution from the plurality of images, wherein the second image comprises at least one transparent region and one non-transparent region; and generating the preview image by at least partially filling the second area on the source image with a non-transparent region of the second image at the second resolution so that the unfilled region of the first area on the source image becomes at least partially filled with the non-transparent region the second image.

43. The method of claim 42, wherein said partially filling a second area on the composite image further comprises filling the second image in at least a portion of the second area on the composite image that has previously been filled by at least a portion of the non-transparent portion of the first image.

44. The method of claim 42, wherein said partially filling a second area on the composite image further comprises filling the second image in the second area on the composite image that are unfilled by the first image.

45. The method as in claim 34, 35, or 36, wherein said selecting a first area on the source image comprises:

placing a bounding box over a plurality of areas over the source image;

calculating an unfilled area in the bounding box at each of the plurality of areas over the source image; and selecting an area from the plurality of areas over the source image that has the largest unfilled area.

46. The method of claim 45, wherein said calculating an unfilled area in the bounding box comprises:

maintaining a mask of the source image in which areas that arc filled by images from the plurality of images are flagged; and summing areas in the bounding box that have not been flagged.

47. The method of claim 45, wherein said selecting a first area on the source image further comprises, if two or more areas from the plurality of areas have the largest unfilled area, selecting an area from the two or more areas that has the shortest distance to the center of the source image.

48. The method of claim 47, wherein said selecting a first area on the source image further comprises, if two or more areas from the plurality of areas have the largest unfilled area and the shortest distance to the center of the source image, selecting an area from the two or more areas that creates the smallest angle between a reference line and a line from the center of the area to the center of the source image.

49. The method as in claim 34, 35, or 36, wherein said selecting a first image comprises choosing an image from the plurality of images that has not been selected over a predetermined number of times.

50. The method as in claim 34, 35, or 36, further comprising adjusting the color of the first image to resemble the color of the first area on the source image prior to said generating the composite image.

51. The method of claim 50, wherein said adjusting the color of the first image comprises:

Adjusted red=$r+(avgR0-avgR)$

Adjusted green=$g+(avgG0-avgG)$

Adjusted blue=$b+(avgB0-avgB)$ wherein adjusted red, adjusted green, and adjusted blue are the red, green, and blue values of pixels of the first image to be displayed; r, g, and b are the original red, green, and blue values of the pixels of the first image that are not transparent; avgR0, avgG0, and avgB0 are the average red, green, and blue values of the first area on the source image; and avgR, avgG, and avgB are the average red, green, and blue values of the first image.

52. The method as in claim 34, 35, or 36, further comprising scaling the first image from the first resolution to the second resolution.

53. The method as in claim 34, 35, or 36, further comprising loading the plurality of images at the second resolution into RAM.

* * * * *

UNITED STATES PATENT AND TRADEMARK OFFICE
CERTIFICATE OF CORRECTION

PATENT NO. : 6,895,127 B1 Page 1 of 1
DATED : May 17, 2005
INVENTOR(S) : Juneng Zheng It is certified that error appears in the above-identified patent and that said Letters Patent is hereby corrected as shown below:

Column 14,
Line 66, where "the sum of each, adjusted" should read -- the sum of each adjusted --.

Column 15,
Line 33, where "the firs images being" should read -- the first images being --.
Line 49, where "generating composite image" should read -- generating a composite image --.
Line 61, where "the first are" should read -- the first area --.

Column 16,
Line 4, where "large avenge red" should read -- large average red --.

Column 17,
Line 4, where "that are unified by" should read -- that are unfilled by --.

Column 18,
Line 23, where "said selecting the a" should read -- said selecting a --.
Line 60, where "a corresponding apart" should read -- a corresponding part --.
Line 61, where "of the first area" should read -- of the first area --.

Column 22,
Line 20, where "that arc filled" should read -- that are filled --.

Signed and Sealed this

Sixth Day of December, 2005

JON W. DUDAS
*Director of the United States Patent and Trademark Office*